United States Patent
Kiyomura et al.

(10) Patent No.: US 7,117,728 B2
(45) Date of Patent: Oct. 10, 2006

(54) MISFIRE DETECTING APPARATUS FOR INTERNAL COMBUSTION ENGINE AND METHOD THEREOF

(75) Inventors: Akira Kiyomura, Atsugi (JP); Masanobu Ohsaki, Atsugi (JP); Hisanori Ozaki, Tokyo (JP)

(73) Assignees: Hitachi Unisia Automotive, Ltd., Kanagawa (JP); Fuji Heavy Industries Ltd., Tokyo (JP)

( * ) Notice: Subject to any disclaimer, the term of this patent is extended or adjusted under 35 U.S.C. 154(b) by 55 days.

(21) Appl. No.: 10/830,065

(22) Filed: Apr. 23, 2004

(65) Prior Publication Data

US 2004/0211249 A1  Oct. 28, 2004

(30) Foreign Application Priority Data

Apr. 24, 2003  (JP)  ............................. 2003-120325

(51) Int. Cl.
*G01M 15/00*  (2006.01)

(52) U.S. Cl. .................. 73/117.3; 73/116; 73/117.2; 73/118.1

(58) Field of Classification Search ................ 73/117.3
See application file for complete search history.

(56) References Cited

U.S. PATENT DOCUMENTS 5,507,180 A * 4/1996 Tomisawa ................... 73/117.3
5,574,217 A * 11/1996 McCombie .................. 73/116
5,822,710 A * 10/1998 Mezger et al. .............. 701/110
5,841,025 A * 11/1998 Remboski et al. ......... 73/117.3
5,862,507 A * 1/1999 Wu et al. .................... 701/111
6,006,155 A * 12/1999 Wu et al. .................... 701/111
6,243,641 B1 * 6/2001 Andrews et al. ............ 701/102
6,584,834 B1 * 7/2003 Lehner et al. ................ 73/116
6,907,341 B1 * 6/2005 Aono et al. ................. 701/111

FOREIGN PATENT DOCUMENTS

JP  58-051243 A  3/1983
JP  4-171249 A  6/1992

OTHER PUBLICATIONS

U.S. Appl. No. 10/830,054, filed Apr. 23, 2004, Ohsaki et al.

* cited by examiner

*Primary Examiner*—Edward Lefkowitz
*Assistant Examiner*—Freddie Kirkland, III
(74) *Attorney, Agent, or Firm*—Foley & Lardner LLP (57) ABSTRACT

Whether a misfire occurred is judged based on a comparison between diagnosis data that indicates a variation of an engine rotation speed and a threshold based on engine operating conditions. The threshold is corrected based on data that indicates an average correlation between the diagnosis data and the threshold.

12 Claims, 6 Drawing Sheets

MISFIRE DETECTING APPARATUS FOR INTERNAL COMBUSTION ENGINE AND METHOD THEREOF

FIELD OF THE INVENTION

The present invention relates to a misfire detecting apparatus for an internal combustion engine and a method thereof, for judging whether or not a misfire occurred, based on a variation of an engine rotation speed.

RELATED ART

Japanese Unexamined Patent Publication No. 04-171249 and Japanese Unexamined Patent Publication No. 58-051243 each disclose a misfire detecting apparatus in which diagnosis data indicating a variation of an engine rotation speed is calculated, and the diagnosis data and a threshold according to engine operating conditions are compared with each other, to judge whether or not a misfire occurred.

In an internal combustion engine, the engine rotation speed is varied due to a misfire, and is also varied due to the loosening of a flywheel or the deterioration of a clutch.

Further, during the rough road running of a vehicle, there is a case where the engine rotation speed is varied due to a change in power caused by a slight variation of an accelerator opening, or a change in traction of a driving wheel.

In the conventional technique, although the threshold to be compared with the diagnosis data is set according to the engine operating conditions, there is a problem in that it is erroneously judged that a misfire occurred, when the engine rotation speed is varied due to the factor as described above other than the misfire.

SUMMARY OF THE INVENTION

The present invention has an object to provide a misfire detecting apparatus and a method thereof, which does not erroneously judge that a misfire occurred, when an engine rotation speed is varied due to a factor other than a misfire.

In order to achieve the above object, according to the present invention, in a configuration where it is judged whether or not a misfire occurred, based on the comparison between diagnosis data indicating a variation of an engine rotation speed and a threshold based on engine operating conditions, the threshold is corrected, based on data indicating an average correlation between the diagnosis data and the threshold.

The other objects and features of this invention will become understood from the following description with reference to the accompanying drawings.

DESCRIPTION OF EMBODIMENTS

Figure 1:
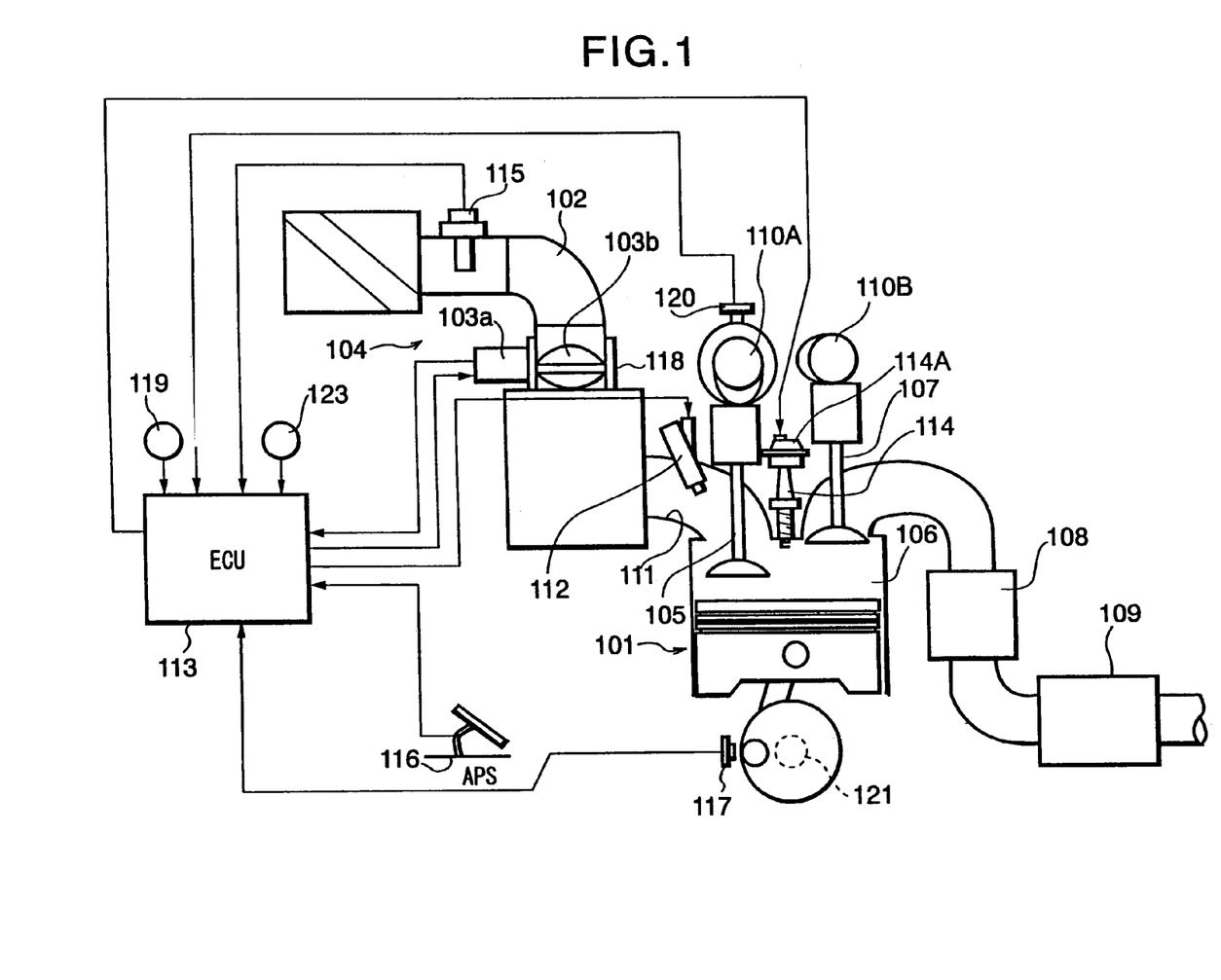
FIG. 1 is a diagram showing a system configuration of an internal combustion engine in an embodiment.

FIG. 1 is diagram showing a system configuration of an internal combustion engine in an embodiment.

In FIG. 1, an electronically controlled throttle chamber 104 is disposed in an intake pipe 102 of an internal combustion engine 101.

Electronically controlled throttle chamber 104 consists of a throttle valve 103b and a throttle motor 103a driving throttle valve 103b to open/close.

Air is sucked into a combustion chamber 106 of engine 101 via electronically controlled throttle chamber 104 and an intake valve 105.

An electromagnetic fuel injection valve 112 is disposed in an intake port 111 on the upstream side of intake valve 105.

Fuel injection valve 112 is driven to open by an injection pulse signal output from an engine control unit (to be abbreviated as ECU hereunder) 113, to inject fuel adjusted at a predetermined pressure toward intake valve 105.

Note, the configuration may be such that fuel injection valve 112 directly injects fuel into combustion chamber 106.

An air-fuel mixture formed in each cylinder is ignited to burn with the spark ignition by an ignition plug 114.

Ignition plug 114 is provided with an ignition coil 114A incorporating therein a power transistor.

ECU 113 performs a switching control of the power transistor, to control ignition timing (an ignition timing advance value) of each cylinder.

A combusted exhaust gas of engine 101 is discharged from combustion chamber 106 via an exhaust valve 107, and is purified by a front catalytic converter 108 and a rear catalytic converter 109, and then emitted into the atmosphere.

Intake valve 105 and exhaust valve 107 are driven to open/close by cams disposed to an intake side camshaft 110A and to an exhaust side camshaft 110B, respectively.

ECU 113 receives detection signals from an accelerator pedal sensor 116 detecting an accelerator opening APS, an air flow meter 115 detecting an intake air amount Q of engine 101, a crank angle sensor 117 taking out a position signal POS for each unit crank angle from a crankshaft 121, a throttle sensor 118 detecting an opening TVO of throttle valve 103b, a water temperature sensor 119 detecting a cooling water temperature Tw of engine 101, a cam sensor 120 taking out a cylinder judgment signal PHASE from intake side camshaft 110A, and the like.

ECU 113 calculates an engine rotation speed Ne based on the position signal POS.

Further, ECU 113 has a function of judging an occurrence of misfire based on a variation of the engine rotation speed Ne. Such a misfire judging function will be described in accordance with flowcharts of FIG. 2 to FIG. 4.

Figure 2:
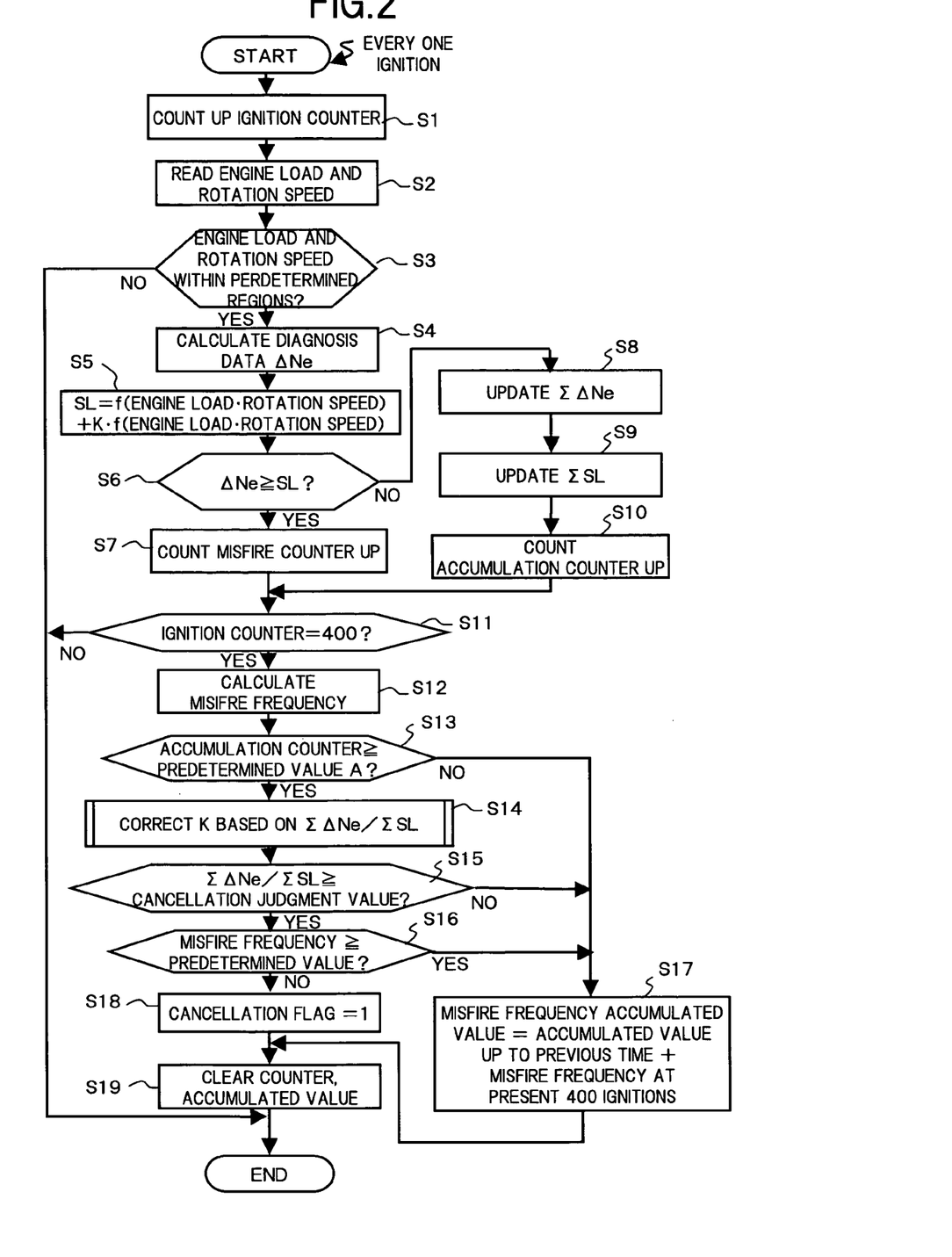
FIG. 2 is a flowchart showing an update control of a misfire frequency accumulated value in a first embodiment.

The flowchart of FIG. 2 shows a routine executed every one ignition (i.e., for each ignition of an ignition plug 114).

In step S1, an ignition counter for counting the number of ignition times is counted up.

In step S2, an engine load Tp and the engine rotation speed Ne are read.

Note, the engine load Tp can be represented by a basic injection quantity in fuel injection valve 112, a cylinder intake air amount, a throttle opening or the like.

In step S3, it is judged whether or not the engine load Tp and the engine rotation speed Ne read in step S2 are within previously set ranges, respectively.

Then, if the engine load Tp and the engine rotation speed Ne are within the previously set ranges, control proceeds to step S4.

In step S4, diagnosis data ΔNe indicating the variation of the engine rotation speed Ne is calculated.

The diagnosis data ΔNe is calculated as a deviation between the engine rotation speeds Ne calculated at two crank angle positions within one ignition cycle.

In step S5, referring to a map storing a basic threshold SL in each region, which is previously classified depending on the engine load Tp and the engine rotation speed Ne, the basic threshold SL corresponding to the engine load Tp and the engine rotation speed Ne at that time is calculated.

Further, in step S5, a final threshold SL is calculated based on the basic threshold SL and a correction coefficient K. An initial value of the correction coefficient K is 0.

Threshold $SL$=basic threshold+correction coefficient $K$×basic threshold

Note, the basic threshold SL is previously set for each of the engine load Tp and the engine rotation speed Ne, as a value at which the diagnosis data ΔNe exceeds the basic threshold SL when a misfire occurred.

In step S6, it is judged whether or not the diagnosis data ΔNe is equal to or above the threshold SL.

Then, if the diagnosis data ΔNe is equal to or above the threshold SL and there is a high possibility of misfire occurrence, control proceeds to step S7, where a misfire counter for counting the number of misfire occurring times is counted up.

On the other hand, if the diagnosis data ΔNe is less than the threshold SL and it is judged that a misfire does not occur, control proceeds to step S8.

In step S8, an accumulated value ΣΔNe up to the previous time is added with the present diagnosis data ΔNe, to update the accumulated value ΣΔNe.

In the next step S9, an accumulated value ΣSL up to the previous time is added with the present threshold SL, to update the accumulated value ΣSL.

In step S10, an accumulation counter for counting the number of accumulating times is counted up.

In step S11, it is judged whether or not a value of the ignition counter reaches 400, and if the value of the ignition counter=400, control proceeds to step S12.

The ignition counter is reset to 0 when control proceeds to S12 and the subsequent steps as described later. Therefore, control proceeds to step S12 and the subsequent steps every 400 ignitions.

In step S12, a misfire frequency is calculated as a ratio between the value of the misfire counter and 400 as the total number of ignition times.

In step S13, it is judged whether or not a value of the accumulation counter is equal to or above a predetermined value A.

Then, if the value of the accumulation counter is less than the predetermined value A, and the number of samples of each of the accumulated value ΣΔNe and the accumulated value ΣSL is less than the predetermined value A, control proceeds to step S17.

In step S17, the misfire frequency presently obtained in step S12 is added to a misfire frequency accumulated value up to the previous time, to update the misfire frequency accumulated value.

Figure 4:
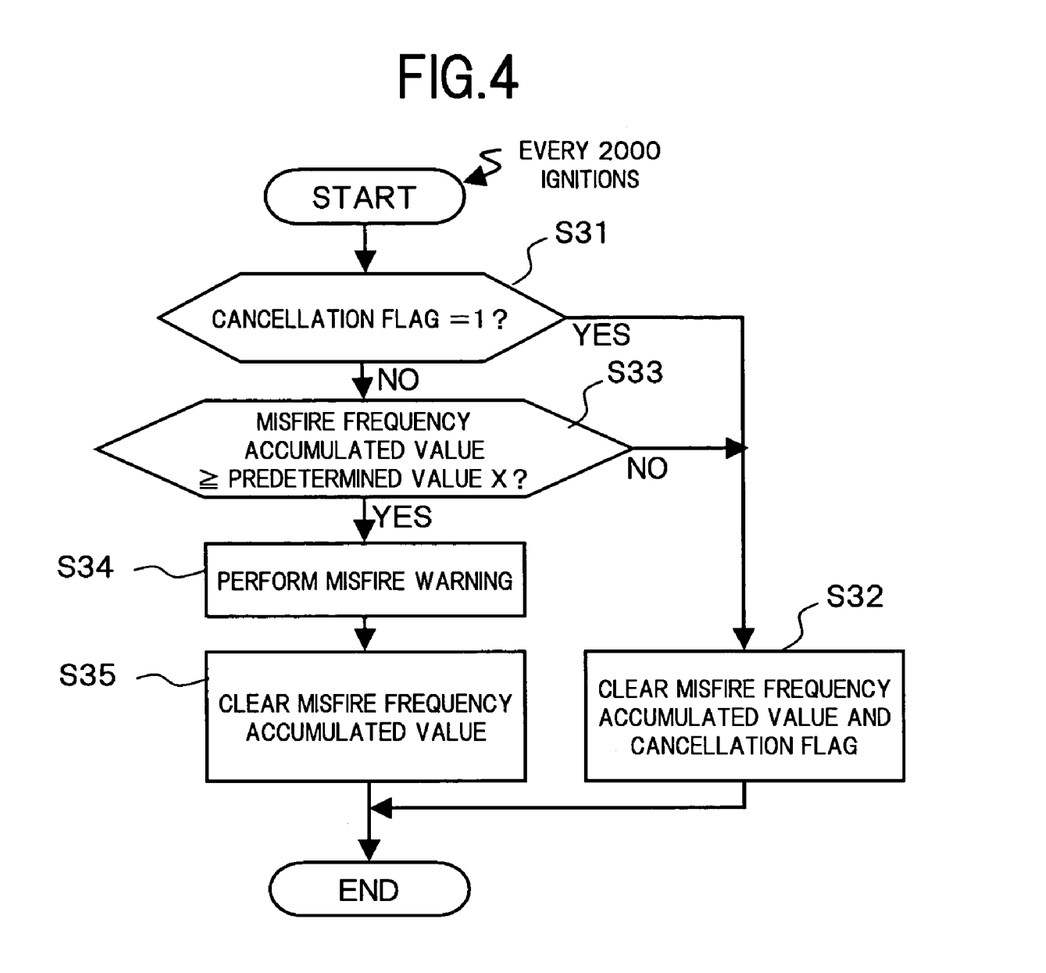
FIG. 4 is a flowchart showing a misfire judgment control in the embodiment.

The misfire frequency accumulated value is used for judging as to whether a final misfire judgment signal (misfire warning) is output, in a routine shown in the flowchart of FIG. 4.

On the other hand, in the case where the value of the accumulation counter is equal to or above the predetermined value A, that is, in the case where the number of samples of each of the accumulated value ΣΔNe and the accumulated value ΣSL is equal to or above the predetermined value A, control proceeds to step S14.

In step S14, the correction coefficient K is updated, based on a ratio between the accumulated value ΣΔNe and the accumulated value ΣSL (ratio=ΣΔNe/ΣSL).

Figure 3:
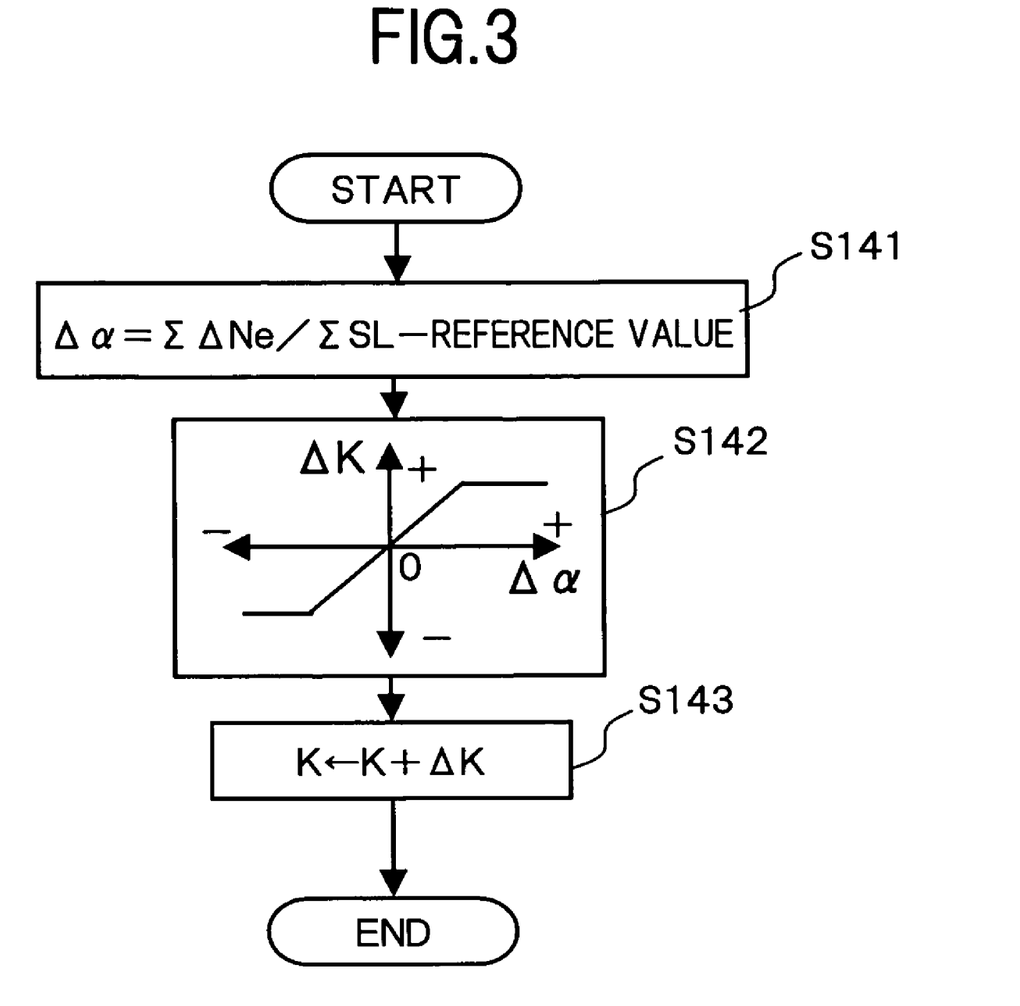
FIG. 3 is a flowchart showing an update control of correction coefficient in the first embodiment.

The process in step S14 is described in detail in the flowchart of FIG. 3.

In step S141, a deviation Δα between ΣΔNe/ΣSL and a previously set reference value is calculated.

$\Delta\alpha = \Sigma \Delta Ne / \Sigma SL$ – reference value

Then, in step S142, a correction value ΔK of the correction coefficient K is set according to the deviation Δα.

The correction value ΔK is set to a positive value, an absolute value of which is increased according to an increase of an absolute value of Δα, when Δα is a positive value, while being set to a negative value, an absolute value of which is increased according to the increase of the absolute value of Δα, when Δα is a negative value. Further, the correction value ΔK is set to 0 when Δα is 0.

In step S143, a result obtained by adding the correction value ΔK to the correction coefficient K up to the previous time, is made to be a new correction coefficient K.

ΣΔNe/ΣSL, which is a value that becomes larger when the diagnosis data ΔNe becomes larger averagely to approach averagely the threshold SL, is data indicating an average correlation between the diagnosis data ΔNe and the threshold SL.

Note, a simple average value of the diagnosis data ΔNe is obtained if ΣΔNe/the number of accumulating times, and a simple average value of the threshold SL is obtained if ΣSL/the number of accumulating times. However, since (ΣΔNe/the number of accumulating times)/(ΣSL/the number of accumulating times)=ΣΔNe/ΣSL, the division by the number of accumulating times is omitted.

Further, in the calculation of ΣΔNe and ΣSL, the diagnosis data ΔNe and the threshold SL for when the occurrence of misfire is judged, are eliminated from the samples.

Accordingly, the average correlation between the diagnosis data ΔNe and the threshold SL, which is indicated by ΣΔNe/ΣSL, shows an increase tendency of rotation speed variation due to a factor other than misfire.

Here, when ΣΔNe/ΣSL is larger than the reference value, it is a state where the diagnosis data ΔNe is averagely too closer to the threshold SL due to a factor other than misfire. In this case, since the diagnosis data ΔNe easily exceeds the threshold SL, there is a possibility of erroneous judgment of misfire.

Therefore, the threshold SL is increasingly corrected by increasingly correcting the correction coefficient K, that is, the threshold SL is increased by an averagely increased portion of the diagnosis data ΔNe, so that the diagnosis data ΔNe exceeds the threshold SL only when a misfire occurred.

On the other hand, when ΣΔNe/ΣSL is less than the reference value, since the threshold SL is too larger than an average level of the diagnosis data ΔNe, there is a possibility that the rotation speed variation due to misfire is not detected.

Therefore, the threshold SL is decreasingly corrected by decreasingly correcting the correction coefficient K, so that the diagnosis data ΔNe exceeds the threshold SL when a misfire occurred.

Namely, the correction coefficient K is corrected so that ΣΔNe/ΣSL approaches the reference value.

If the threshold SL is corrected in such a manner, it is possible to avoid the erroneous judgment of misfire when the rotation speed variation is increased due to a factor other than misfire, such as the loosening of a flywheel, the deterioration of a clutch or the rough road running of a vehicle, and also it is possible to judge reliably a misfire in a state where the rotation speed variation is averagely low.

Note, the correction result of the correction coefficient K is applied to the misfire judgment during the next 400 ignitions.

If the correction coefficient K is corrected as described above in step S14 in the flowchart of FIG. 2, then in the next step S15, it is judged whether or not $\Sigma \Delta Ne/\Sigma SL$ is equal to or above a cancellation judgment value.

As described in the above, since the correction result of the correction coefficient K is applied to the misfire judgment during the next 400 ignitions, there is the case where the misfire judgment in step S6 is performed according to the threshold SL based on the correction coefficient K adapted to the flat road driving up to the previous time, just after entering the rough road running.

Therefore, it is judged based on the comparison between $\Sigma \Delta Ne/\Sigma SL$ and the cancellation judgment value that the threshold SL is unable to follow an increasing change in average scale of the diagnosis data $\Delta Ne$.

Here, if $\Sigma \Delta Ne/\Sigma SL$<cancellation judgment value, the misfire frequency calculated in step S12 is considered to be detected based on an appropriate threshold SL, and then control proceeds to step S17.

On the other hand, if $\Sigma \Delta Ne/\Sigma SL \geq$ cancellation judgment value, since the diagnosis data $\Delta Ne$ is averagely too closer to the threshold SL, there is a possibility of erroneous judgment of misfire, and then control proceeds to step S16.

In step S16, it is judged whether or not the misfire frequency obtained in step S12 is equal to or above a predetermined value.

Then, if the misfire frequency is equal to or above the predetermined value, control proceeds to step S17, where the misfire frequency accumulated value is updated. If the misfire frequency is less than the predetermined value, control proceeds to step S18, where 1 is set to a cancellation flag.

In the case where $\Sigma \Delta Ne/\Sigma SL$ is equal to or above the cancellation judgment value, there is a possibility of erroneous judgment of misfire. However, if the misfire frequency is equal to or above the predetermined value, there is a high possibility that a misfire actually occurred even if the rotation speed variation is increased caused by a factor other than misfire, such as the loosening of the flywheel, the deterioration of the clutch or the rough road running of the vehicle. Accordingly, control proceeds to step S17, where the misfire frequency accumulated value is updated.

In the case where $\Sigma \Delta Ne/\Sigma SL$ is equal to or above the cancellation judgment value and also the misfire frequency is less than the predetermined value, there is a possibility of erroneous judgment of misfire although a misfire does not actually occur. Accordingly, control proceeds to step S18, where 1 is set to the cancellation flag, so as to cancel a final misfire judgment based on the misfire frequency accumulated value described later.

If the accumulation counter has a value less than the predetermined value A and the number of samples of diagnosis data $\Delta Ne$ for when the accumulated values $\Sigma \Delta Ne$ and $\Sigma SL$ are obtained, it is impossible to judge with high accuracy an influence, such as the loosening of the flywheel, the deterioration of the clutch or the rough road running of the vehicle, on the diagnosis data $\Delta Ne$, based on $\Sigma \Delta Ne/\Sigma SL$.

Therefore, the correction of the correction coefficient K based on $\Sigma \Delta Ne/\Sigma SL$ and the setting of the cancellation flag based on $\Sigma \Delta Ne/\Sigma SL$ are performed when the accumulation counter has a value equal or above the predetermined value A.

Then, if the accumulation counter has the value less than the predetermined value A, control proceeds to step S17, where the misfire frequency accumulated value is updated, to avoid the erroneous correction of the correction coefficient K and the erroneous cancellation of misfire judgment.

In step S19, the ignition counter, the accumulation counter, the misfire counter, and the accumulated values $\Sigma \Delta Ne$ and $\Sigma SL$, are cleared, to terminate the present routine.

The flowchart of FIG. 4 shows a routine executed every 2000 ignitions. In step S31, it is judged whether or not 1 is set to the cancellation flag.

If 1 is set to the cancellation flag, control proceeds to step S32, where the misfire frequency accumulated value and the cancellation flag are cleared to terminate the present routine.

Accordingly, in the case where the correction of the threshold SL is unable to follow the averagely increase of the diagnosis data $\Delta Ne$ by the influence, such as the loosening of the flywheel, the deterioration of the clutch or the rough road running of the vehicle, it is possible to prevent the erroneous misfire warning, thereby enabling the improvement of reliability of misfire judgment.

On the other hand, if it is judged in step S31 that 0 is set to the cancellation flag, control proceeds to step S33, where it is judged whether or not the misfire frequency accumulated value is equal to or above a predetermined value X.

The misfire frequency is obtained every 400 ignitions while the present routine is executed every 2000 ignitions. Therefore, the misfire frequency accumulated value to be compared with the predetermined value X in step S33 becomes a value obtained by accumulating sequentially the misfire frequency obtained every 400 ignitions by the five numbers of times.

If it is judged in step S33 that the misfire frequency accumulated value is equal to or above the predetermined value X, control proceeds to step S34, where the misfire warning is given to a driver by means of a warning device 123, such as a lamp, a buzzer or the like.

Note, the configuration of the present embodiment has been such that the output of the final misfire judgment signal is an output of an operation signal of warning device 123. However, the present invention is not limited thereto, and the configuration may be such that, for example, the misfire judgment signal is made a prohibition signal of the lean air-fuel ratio combustion, to forcibly shift a target air-fuel ratio from a lean air-fuel ratio to a stoichiometric air-fuel ratio.

In step S35, the misfire frequency accumulated value is cleared, to terminate the present routine.

In the above embodiment, the configuration has been such that $\Sigma \Delta Ne/\Sigma SL$ is calculated as the data indicating the average correction between the diagnosis data $\Delta Ne$ and the threshold SL. However, it is possible that $\Delta Ne/SL$ is calculated at each time when the diagnosis data $\Delta Ne$ is calculated, and this $\Delta Ne/SL$ is accumulated. An embodiment having such a configuration is shown in flowcharts of FIG. 5 and FIG. 6.

Figure 5:
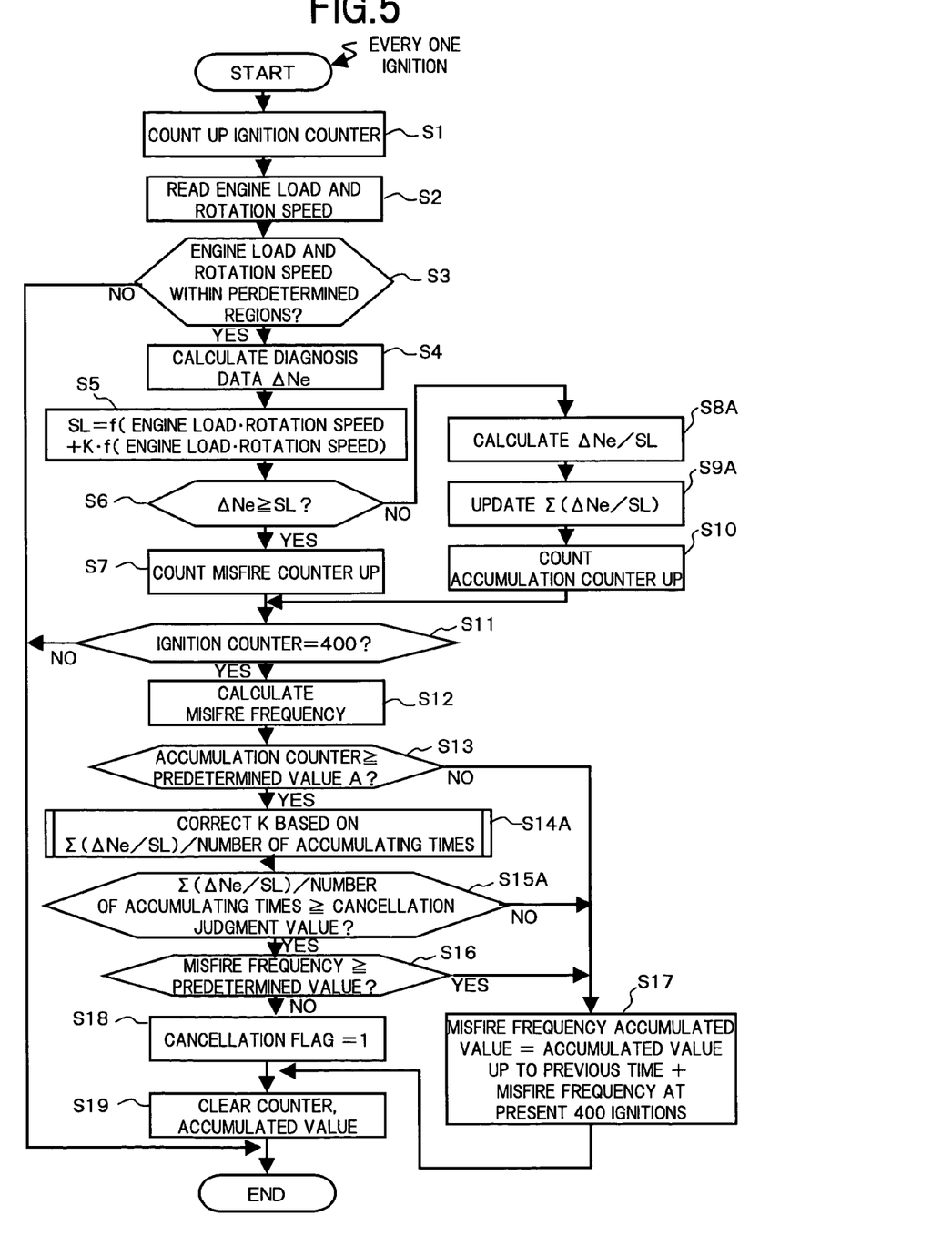
FIG. 5 is a flowchart showing a second embodiment of the update control of the misfire frequency accumulated value.

The flowchart of FIG. 5 differs from the flowchart of FIG. 2 only in steps S8A, S9A, S14A and S15A. Therefore, the steps in the flowchart of FIG. 5, which execute the same processing as in the steps in the flowchart of FIG. 2, are denoted by the same numerals as in the flowchart of FIG. 2, and the description thereof is omitted.

In step S8A in the flowchart of FIG. 5, a ratio between the presently calculated diagnosis data ΔNe and the threshold SL (ratio=ΔNe/SL) is calculated.

In step S9A, the accumulated value Σ(ΔNe/SL) of ΔNe/SL is updated.

Then, ΔNe/SL is accumulated between each 400 ignitions, and control proceeds to step S14A, where the correction coefficient K, is updated based on the accumulated value Σ(ΔNe/SL)/the number of accumulating times, that is, an average value of ΔNe/SL.

In step S15A, it is judged whether or not the accumulated value Σ(ΔNe/SL)/the number of accumulating times is equal to or above the previously set cancellation judgment value.

In the present embodiment, the average value of ΔNe/SL is the data indicating the average correlation between the diagnosis data ΔNe and the threshold SL.

Figure 6:
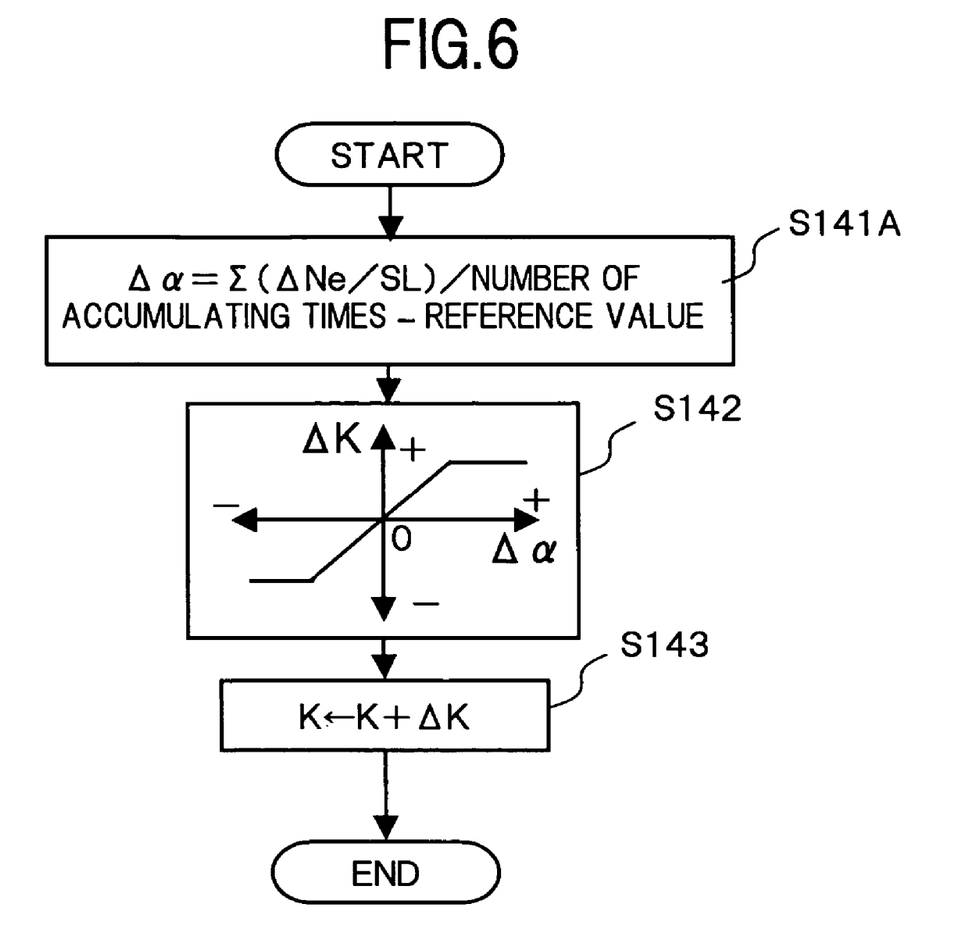
FIG. 6 is a flowchart showing an update control of correction coefficient in the second embodiment.

The correction process of the correction coefficient K in step S14A is described in detail in the flowchart of FIG. 6.

In step S141A, the deviation Δα is calculated.

$$\Delta\alpha = \Sigma(\Delta Ne/SL)/\text{the number of accumulating times} - \text{reference value}$$

In step S142, the correction value ΔK is set according to the deviation Δα, so that the accumulated value Σ(ΔNe/SL)/the number of accumulating times approaches the reference value, and in step S143, the correction coefficient K is updated based on the correction value ΔK.

Further, in the case where it is judged in step S15A that the accumulated value Σ(ΔNe/SL)/the number of accumulating times is less than the cancellation judgment value, it is judged that the misfire judgment is performed based on the appropriate threshold SL, and then control proceeds to step S17, where the misfire frequency is accumulated.

On the other hand, in the case where the accumulated value Σ(ΔNe/SL)/the number of accumulating times is equal to or above the cancellation judgment value, it is judged in step S16 whether or not the misfire frequency is equal to or above the predetermined value. Then, in the case where the misfire frequency is less than the predetermined value and it is not an apparent misfire condition, it is estimated that the threshold SL is not changed following the influence due to such as the loosening of the flywheel, the deterioration of the clutch or the rough road running of the vehicle, and then control proceeds to step S18, where 1 is set to the cancellation flag.

Further, if the misfire frequency is equal to or above the predetermined value, it is judged that a misfire actually occurred even if the threshold SL does not follow the influence by the loosening of the flywheel or the deterioration of the clutch, or the rough road running of the vehicle, and therefore, control proceeds to step S17, where the misfire frequency is accumulated.

Note, in the above embodiment, the configuration has been such that timing for obtaining the average correlation between the diagnosis data ΔNe and the threshold SL is every 400 ignitions, and the final misfire judgment is performed every 2000 ignitions. However, it is apparent that the present invention is not limited to such number of ignition times.

Further, the configuration may be such that 400 ignitions interval during which the average correlation between the diagnosis data ΔNe and the threshold SL is obtained, and 400 ignitions interval during which the misfire judgment is performed based on the threshold SL corrected with the correction coefficient K set based on the average correlation, are distinguished from each other, to execute alternately the detection of average correlation and the adoption of correction based on the correlation.

The entire contents of Japanese Patent Application No. 2003-120325 filed on Apr. 24, 2003, a priority of which is claimed, are incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention is provided for illustration only, and not for the purpose of limiting the invention as defined in the appended claims and their equivalents.

What is claimed is:

1. A misfire detecting apparatus for an internal combustion engine comprising:
    an operating condition detector that is configured to detect engine operating conditions inclusive of an engine rotation speed; and
    a calculating section that is configured to:
        judge whether a misfire occurred, based on the engine rotation speed detected by said operating condition detector;
        output a misfire judgment signal;
        calculate diagnosis data indicating a variation of said engine rotation speed;
        calculate a threshold based on said engine operating conditions;
        judge whether a misfire occurred, based on a comparison between said diagnosis data and said threshold;
        calculate a correction value for correcting said threshold based on data indicating an average correlation between said diagnosis data and said threshold, to correct said threshold with said correction value; and
        calculate a correction value, which corrects said threshold to be larger as said diagnosis data averagely approaches said threshold.

2. A misfire detecting apparatus for an internal combustion engine according to claim 1, wherein said calculating section is also configured to cancel the misfire judgment, based on said data indicating the average correlation between said diagnosis data and said threshold.

3. A misfire detecting apparatus for an internal combustion engine comprising:
    an operating condition detector that is configured to detect engine operating conditions inclusive of an engine rotation speed; and
    a calculating section that is configured to:
        judge whether a misfire occurred, based on the engine rotation speed detected by said operating condition detector;
        output a misfire judgment signal;
        calculate diagnosis data indicating a variation of said engine rotation speed;
        calculate a threshold based on said engine operating conditions;
        judge whether a misfire occurred, based on a comparison between said diagnosis data and said threshold;
        calculate a correction value for correcting said threshold based on data indicating an average correlation between said diagnosis data and said threshold, to correct said threshold with said correction value; and eliminate said diagnosis data and said threshold when said diagnosis data is equal to or above said threshold, from samples for calculating said data indicating the average correlation.

4. A misfire detecting apparatus for an internal combustion engine according to claim 3, wherein said calculating section is also configured to prohibit an update of said correction value on the basis of said data indicating the average correlation, when the number of samples of said diagnosis data and said threshold used for the calculation of said data indicating the average correlation is less than a predetermined value.

5. A misfire detecting apparatus for an internal combustion engine comprising:
an operating condition detector that is configured to detect engine operating conditions inclusive of an engine rotation speed; and
a calculating section that is configured to:
judge whether a misfire occurred, based on the engine rotation speed detected by said operating condition detector;
output a misfire judgment signal;
calculate diagnosis data indicating a variation of said engine rotation speed;
calculate a threshold based on said engine operating conditions;
judge whether a misfire occurred, based on a comparison between said diagnosis data and said threshold;
calculate a correction value for correcting said threshold based on data indicating an average correlation between said diagnosis data and said threshold, to correct said threshold with said correction value;
wherein said calculating section is configured to:
cancel the misfire judgment, based on said data indicating the average correlation between said diagnosis data and said threshold; and
prohibit said cancellation process, when a misfire frequency during a period of time in which said data indicating the average correlation is obtained, is equal to or above a predetermined value.

6. A misfire detecting apparatus for an internal combustion engine comprising:
an operating condition detector that is configured to detect engine operating conditions inclusive of an engine rotation speed; and
a calculating section that is configured to:
judge whether a misfire occurred, based on the engine rotation speed detected by said operating condition detector;
output a misfire judgment signal;
calculate diagnosis data indicating a variation of said engine rotation speed;
calculate a threshold based on said engine operating conditions;
judge whether a misfire occurred, based on a comparison between said diagnosis data and said threshold;
calculate a correction value for correcting said threshold based on data indicating an average correlation between said diagnosis data and said threshold, to correct said threshold with said correction value; and
obtain said data indicating the average correlation, as an average value per the predetermined number of ignitions.

7. A misfire detecting method for an internal combustion engine comprising the steps of:
detecting engine operating conditions inclusive of an engine rotation speed;
calculating diagnosis data indicating a variation of said engine rotation speed;
calculating a threshold based on said engine operating conditions;
judging whether a misfire occurred, based on the comparison between said diagnosis data and said threshold;
calculating data indicating an average correlation between said diagnosis data and said threshold;
calculating a correction value for said threshold based on said data indicating the average correlation between said diagnosis data and said threshold; wherein said correction value corrects said threshold to be larger as said diagnosis data averagely approaches said threshold; and
correcting said threshold with said correction value.

8. A misfire detecting method for an internal combustion engine according to caim 7, further comprising the step of:
canceling the misfire judgment, based on said data indicating the average correlation between said diagnosis data and said threshold.

9. A misfire detecting method for an internal combustion engine comprising the steps of:
detecting engine operating conditions inclusive of an engine rotation speed;
calculating diagnosis data indicating a variation of said engine rotation speed;
calculating a threshold based on said engine operating conditions;
judging whether a misfire occurred, based on the comparison between said diagnosis data and said threshold;
calculating data indicating an average correlation between said diagnosis data and said threshold;
calculating a correction value for said threshold based on said data indicating the average correlation between said diagnosis data and said threshold; and
correcting said threshold with said correction value,
wherein said step of calculating the data indicating the average correlation comprises the step of:
eliminating said diagnosis data and said threshold when said diagnosis data is equal to or above said threshold, from samples for calculating said data indicating the average correlation.

10. A misfire detecting method for an internal combustion engine according to claim 9, further comprising the step of:
prohibiting the cancellation of the misfire judgment on the basis of said data indicating the average correlation, when the number of samples of said diagnosis data and said threshold used for the calculation of said data indicating the average correlation is less than a predetermined value.

11. A misfire detecting method for an internal combustion engine comprising the steps of:
detecting engine operating conditions inclusive of an engine rotation speed;
calculating diagnosis data indicating a variation of said engine rotation speed;
calculating a threshold based on said engine operating conditions;
judging whether a misfire occurred, based on the comparison between said diagnosis data and said threshold;
calculating data indicating an average correlation between said diagnosis data and said threshold;
calculating a correction value for said threshold based on said data indicating the average correlation between said diagnosis data and said threshold;
correcting said threshold with said correction value;

canceling the misfire judgment, based on said data indicating the average correlation between said diagnosis data and said threshold; and prohibiting the cancellation of the misfire judgment, when a misfire frequency during a period of time in which said average correlation is obtained, is equal to or above a predetermined value.

12. A misfire detecting method for an internal combustion engine comprising the steps of:

detecting engine operating conditions inclusive of an engine rotation speed;

calculating diagnosis data indicating a variation of said engine rotation speed;

calculating a threshold based on said engine operating conditions;

judging whether a misfire occurred, based on the comparison between said diagnosis data and said threshold;

calculating data indicating an average correlation between said diagnosis data and said threshold;

calculating a correction value for said threshold based on said data indicating the average correlation between said diagnosis data and said threshold; and correcting said threshold with said correction value, wherein said step of calculating the data indicating the average correlation comprises the step of:

calculating said data indicating the average correlation, as an average value per the predetermined number of ignitions.

* * * * *